United States Patent
Sridhara et al.

(10) Patent No.: US 9,037,180 B2
(45) Date of Patent: May 19, 2015

(54) MEASUREMENTS AND INFORMATION GATHERING IN A WIRELESS NETWORK ENVIRONMENT

(75) Inventors: Vinay Sridhara, Sunnyvale, CA (US); Rajarshi Gupta, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 300 days.

(21) Appl. No.: 13/398,653

(22) Filed: Feb. 16, 2012

(65) Prior Publication Data

US 2012/0295654 A1 Nov. 22, 2012

Related U.S. Application Data

(60) Provisional application No. 61/488,091, filed on May 19, 2011.

(51) Int. Cl.
*H04B 7/00* (2006.01)
*G01S 5/02* (2010.01)
*H04B 17/00* (2006.01)

(52) U.S. Cl.
CPC ........ *H04B 17/0072* (2013.01); *H04B 17/0037* (2013.01); *G01S 5/0273* (2013.01); *G01S 5/0226* (2013.01); *G01S 5/0205* (2013.01)
USPC ...... 455/517; 455/343.1; 455/41.1; 455/41.2; 455/522; 455/574

(58) Field of Classification Search
CPC .......................... H04B 17/0037; G01S 5/0226
USPC ............ 455/517, 343.1, 41.1, 41.2, 522, 574; 370/252
See application file for complete search history.

(56) References Cited

U.S. PATENT DOCUMENTS 6,321,068 B1 11/2001 Zamat
6,560,462 B1 5/2003 Ravi et al.
(Continued)

FOREIGN PATENT DOCUMENTS

CN 1431839 A 7/2003
CN 1527623 A 9/2004
(Continued)

OTHER PUBLICATIONS

International Search Report and Written Opinion—PCT/US2012/025720—ISA/EPO—Apr. 26, 2012 (111650WO).
(Continued)

*Primary Examiner* — Sanh Phu
(74) *Attorney, Agent, or Firm* — Hunter Clark PLLC

(57) ABSTRACT

Disclosed are methods, apparatus, computer readable media and other implementations, including a method for communicating network information. The method includes transmitting a request message from a mobile device to an access point, and receiving, at the mobile device, a reply message transmitted from the access point in response to receiving the request message, the reply message including data representative of a transmitted signal power level at the access point of the reply message. The method further includes determining, based on the received reply message including the data representative of the transmitted signal power level at the access point, a received signal power level at the mobile device of the reply message, and a round trip time from a first time instance when the request message was transmitted from the mobile device to a second time instance when the reply message was received at the mobile device.

55 Claims, 8 Drawing Sheets

(56) References Cited

U.S. PATENT DOCUMENTS

| | | | |
|---|---|---|---|
| 6,956,829 B2* | 10/2005 | Lee et al. | 370/280 |
| 7,903,611 B2 | 3/2011 | Wu et al. | |
| 8,321,735 B2* | 11/2012 | Vihriala | 714/748 |
| 8,583,074 B2* | 11/2013 | Verstraelen et al. | 455/343.1 |
| 2003/0131299 A1 | 7/2003 | Ahn et al. | |
| 2006/0075131 A1 | 4/2006 | Douglas et al. | |
| 2006/0168343 A1 | 7/2006 | Ma et al. | |
| 2008/0007404 A1* | 1/2008 | Albert et al. | 340/552 |
| 2009/0059867 A1* | 3/2009 | Rajasimman et al. | 370/332 |
| 2010/0135178 A1* | 6/2010 | Aggarwal et al. | 370/252 |
| 2010/0142709 A1 | 6/2010 | Robert et al. | |
| 2011/0028175 A1 | 2/2011 | Chang et al. | |
| 2011/0044199 A1 | 2/2011 | Kazmi et al. | |
| 2012/0225665 A1* | 9/2012 | Alexander et al. | 455/456.1 |

FOREIGN PATENT DOCUMENTS

| | | | |
|---|---|---|---|
| CN | 1972520 A | 5/2007 | |
| JP | 2001298764 A | 10/2001 | |
| JP | 2003023367 A | 1/2003 | |
| JP | 2003299140 A | 10/2003 | |
| JP | 2009089203 A | 4/2009 | |
| WO | WO02080597 A1 | 10/2002 | |
| WO | WO2007031844 | 3/2007 | |
| WO | WO2010059934 | 5/2010 | |

OTHER PUBLICATIONS

Taiwan Search Report—TW101105822—TIPO—Apr. 26, 2014 (111650TW), 1 page.

Kwak, J., & Rudolf, M. (Jul. 2003). PHY measurements for interference reduction from 11h [PowerPoint slides]. IEEE 802.11 Working Group, doc: 802.11-03/537r0. Retrieved from https://mentor.ieee.org/802.11/documents?is_dcn=537&is_year=2003.

* cited by examiner

MEASUREMENTS AND INFORMATION GATHERING IN A WIRELESS NETWORK ENVIRONMENT

CROSS-REFERENCE TO RELATED APPLICATIONS

This application claims the benefit of and priority to provisional U.S. application Ser. No. 61/488,091, entitled "WIFI MEASUREMENT GATHERING FOR INDOOR POSITIONING," and filed May 19, 2011, the content of which is incorporated herein by reference in its entirety.

FIELD

The present disclosure relates in general to systems, devices, methods, products, and other implementations, to determine communication measurements (e.g., signal strength, round trip time, etc.), and more particularly to efficiently gather/obtain data relating to communication measurements (e.g., WiFi communication measurements) to facilitate positioning functionality (e.g., indoor positioning).

BACKGROUND

In order to perform navigation operations using a mobile device, including indoor navigation operations, three pieces of information may be required to be determined based on data from an access point node (AP) with which the mobile device is communicating. These include: 1) a received signal strength, which may be expressed as a received signal strength indication (RSSI), which is an indication of the power level received by an antenna of the mobile device, 2) a round trip time (RTT), which generally corresponds to the length of time it takes a signal to be sent from the mobile device to the AP plus the length of time it takes for a reply message to that signal to be received at the mobile device, and 3) the power transmitted (Tx power) by the AP with which a mobile device is communicating. The Tx power may be required, especially in circumstances where an access point performs dynamic Tx power control operations, to enable computation of a signal path loss or to facilitate determination of a device's position.

SUMMARY

In some implementations, systems, apparatus, devices and methods are provided to determine RTT, RSSI and/or the Tx Power (i.e., transmission power) based on a compact communication exchange, e.g., using an exchange of one message in each direction of a bi-directional link, to optimize time and energy consumption.

Thus, in some embodiments, a method for communicating network information is provided. The method includes transmitting a request message from a mobile device to an access point, and receiving, at the mobile device, a reply message transmitted from the access point in response to receiving the request message, the reply message including data representative of a transmitted signal power level at the access point of the reply message. The method further includes determining, based on the received reply message including the data representative of the transmitted signal power level at the access point, a received signal power level at the mobile device of the reply message, and a round trip time from a first time instance when the request message was transmitted from the mobile device to a second time instance when the reply message was received at the mobile device.

Embodiments of the method may include at least some of the features described in the present disclosure, including one or more of the following features.

The method may further include determining, based on the received reply message, the transmitted signal power level of the reply message at the access point.

The method may further include determining, based on the determined received signal power level of the reply message and the transmitted signal power level of the reply message, one or more of, for example, a received signal strength indication (RSSI), a path loss associated with the reply message, and/or a distance between the mobile device and the access point.

Receiving the reply message may include receiving the reply message transmitted from the access point with a highest signal power level permissible for the access point.

Transmitting the request message may include transmitting by the mobile device a positioning packet to facilitate determination of a geographical position of the mobile device.

The method may further include measuring the received signal power level of the reply message upon receipt of the reply message at the mobile device.

Receiving the reply message may include receiving an acknowledgement message transmitted from the access point in response to receiving the request message, with at least one of the received signal power level and the round trip time determined from the acknowledgement message, and receiving a measurement reply message transmitted by the access point, with the measurement reply message including the data representative of the transmitted signal power level at the access point of the measurement reply message.

The reply message may include a packet formatted based on a TPC Report Element message of an 802.11k protocol.

The reply message may include one or more of, for example, a packet formatted based on CISCO COMPATIBLE EXTENSIONS™ (CCX™) messages protocol, and/or a packet formatted based on QUIPS™ messages.

In some embodiments, a wireless communication apparatus is provided. The apparatus includes a transceiver to transmit and receive communication messages, and a processor-based device configured to cause operations including transmitting a request message from the wireless communication apparatus to an access point, and receiving, at the wireless communication apparatus, a reply message transmitted from the access point in response to receiving the request message, the reply message including data representative of a transmitted signal power level at the access point of the reply message. The processor-based device is also configured to cause the operation of determining, based on the received reply message including the data representative of the transmitted signal power level at the access point, a received signal power level at the wireless communication apparatus of the reply message, and/or a round trip time from a first time instance when the request message was transmitted from the wireless communication apparatus to a second time instance when the reply message was received at the wireless communication apparatus.

Embodiments of the apparatus may include at least some of features described in the present disclosure, including at least some of the features described above in relation to the method, as well as one or more of the following features.

The processor-based device may further be configured to cause the operation of determining, based on the determined received signal power level of the reply message and the transmitted signal power level of the reply message, one or more of, for example, a received signal strength indication (RSSI), a path loss associated with the reply message, and/or a distance between the wireless communication apparatus and the access point.

The processor-based device configured to cause the operation of receiving the reply message may be configured to cause the operation of receiving the reply message transmitted from the access point with a highest signal power level permissible for the access point.

The processor-based device configured to cause the operation of transmitting the request message may be configured to cause the operation of transmitting by the wireless communication apparatus a positioning packet to facilitate determination of a geographical position of the wireless communication apparatus.

The processor-based device configured to cause the operation of receiving the reply message may be configured to cause the operations of receiving an acknowledgement message transmitted from the access point in response to receiving the request message, with at least one of the received signal power level and the round trip time determined from the acknowledgement message, and receiving a measurement reply message transmitted by the access point, the measurement reply message including the data representative of the transmitted signal power level at the access point of the measurement reply message.

In some embodiments, a wireless communication apparatus is provided. The apparatus includes means for transmitting a request message from the wireless communication apparatus to an access point, and means for receiving, at the wireless communication apparatus, a reply message transmitted from the access point in response to receiving the request message, the reply message including data representative of a transmitted signal power level at the access point of the reply message. The apparatus further includes means for determining, based on the received reply message including the data representative of the transmitted signal power level at the access point, a received signal power level at the wireless communication apparatus of the reply message, and a round trip time from a first time instance when the request message was transmitted from the wireless communication apparatus to a second time instance when the reply message was received at the wireless communication apparatus.

Embodiments of the apparatus may include at least some of features described in the present disclosure, including at least some of the features described above in relation to the method and the first apparatus, as well as one or more of the following features.

The apparatus may further include means for determining, based on the determined received signal power level of the reply message and the transmitted signal power level of the reply message, one or more of, for example, a received signal strength indication (RSSI), a path loss associated with the reply message, and/or a distance between the wireless communication apparatus and the access point.

The means for receiving the reply message may include means for receiving the reply message transmitted from the access point with a highest signal power level permissible for the access point.

The means for transmitting the request message may include means for transmitting by the wireless communication apparatus a positioning packet to facilitate determination of a geographical position of the wireless communication apparatus.

The means for receiving the reply message may include means for receiving an acknowledgement message transmitted from the access point in response to receiving the request message, with at least one of the received signal power level and the round trip time determined from the acknowledgement message, and means for receiving a measurement reply message transmitted by the access point, the measurement reply message including the data representative of the transmitted signal power level at the access point of the measurement reply message.

In some embodiments, non-transitory computer readable media is provided. The computer readable media is programmed with a set of instructions executable on a processor that, when executed, cause operations for communicating network information that include transmitting a request message from a mobile device to an access point, and receiving, at the mobile device, a reply message transmitted from the access point in response to receiving the request message, the reply message including data representative of a transmitted signal power level at the access point of the reply message. The set of instructions further comprises instructions that cause operations including determining, based on the received reply message including the data representative of the transmitted signal power level at the access point, a received signal power level at the mobile device of the reply message, and a round trip time from a first time instance when the request message was transmitted from the mobile device to a second time instance when the reply message was received at the mobile device.

Embodiments of the computer readable media may include at least some of features described in the present disclosure, including at least some of the features described above in relation to the method and the apparatus, as well as one or more of the following features.

The set of instructions may further include instructions that cause the operation of determining, based on the determined received signal power level of the reply message and the transmitted signal power level of the reply message, one or more of, for example, a received signal strength indication (RSSI), a path loss associated with the reply message, and/or a distance between the mobile device and the access point.

The instructions to cause the operation of receiving the reply message may include instructions to cause the operation of receiving the reply message transmitted from the access point with a highest signal power level permissible for the access point.

The instructions to cause the operation of transmitting the request message may include instructions to cause the operation of transmitting by the mobile device a positioning packet to facilitate determination of a geographical position of the mobile device.

The instructions to cause the operation of receiving the reply message may include instructions to cause the operations of receiving an acknowledgement message transmitted from the access point in response to receiving the request message, with at least one of the received signal power level and the round trip time determined from the acknowledgement message, and receiving a measurement reply message transmitted by the access point, the measurement reply message including the data representative of the transmitted signal power level at the access point of the measurement reply message.

In some embodiments, a method for communicating network information is provided. The method includes receiving at an access point a request message sent from a mobile device, and in response to receiving the request message, transmitting, from the access point to the mobile device, a reply message including data representative of a transmitted signal power level at the access point of the reply message. The reply message including the data representative of the transmitted signal power level at the access point is configured to enable determination of a received signal power level at the mobile device of the reply message, and a round trip time from a first time instance when the request message was transmitted from the mobile device to a second time instance when the reply message was received at the mobile device.

Embodiments of the method may include at least some of features described in the present disclosure, including at least some of the features described above in relation to the first method, the apparatus, and the computer readable media, as well as one or more of the following features.

The reply message may further be configured to enable determination of the transmitted signal power level of the reply message at the access point.

The reply message may further be configured to enable, using the determined received signal power level of the reply message and the transmitted signal power level of the reply message, determination of one or more of, for example, a received signal strength indication (RSSI), a path loss associated with the reply message, and/or a distance between the mobile device and the access point.

Transmitting the reply message may include transmitting the reply message from the access point with a highest signal power level permissible for the access point.

Receiving the request message may include receiving by the access point a positioning packet to facilitate determination of a geographical position of the mobile device.

Transmitting the reply message may include transmitting an acknowledgement message from the access point in response to receiving the request message, with at least one of the received signal power level and the round trip time determined from the acknowledgement message, and transmitting a measurement reply message by the access point, the measurement reply message including the data representative of the transmitted signal power level at the access point of the measurement reply message.

In some embodiments, a wireless communication apparatus is provided. The apparatus includes a transceiver to transmit and receive communication messages, and a processor-based device configured to cause operations including receiving at the wireless communication apparatus a request message sent from a mobile device, and, in response to receiving the request message, transmitting, from the wireless communication apparatus to the mobile device, a reply message including data representative of a transmitted signal power level at the wireless communication apparatus of the reply message. The reply message including the data representative of the transmitted signal power level at the wireless communication apparatus is configured to enable determination of a received signal power level at the mobile device of the reply message, and a round trip time from a first time instance when the request message was transmitted from the mobile device to a second time instance when the reply message was received at the mobile device.

Embodiments of the apparatus may include at least some of features described in the present disclosure, including at least some of the features described above in relation to the methods, the apparatus, and the computer readable media, as well as one or more of the following features.

The processor-based device configured to cause the operation of transmitting the reply message may be configured to cause the operation of transmitting the reply message from the wireless communication apparatus with a highest signal power level permissible for the wireless communication apparatus.

The processor-based device configured to cause the operation of receiving the request message may be configured to cause the operation of receiving by the wireless communication apparatus a positioning packet to facilitate determination of a geographical position of the mobile device.

The processor-based device configured to cause the operation of transmitting the reply message may be configured to cause the operations of transmitting an acknowledgement message from the wireless communication apparatus in response to receiving the request message, with at least one of the received signal power level and the round trip time determined from the acknowledgement message, and transmitting a measurement reply message by the wireless communication apparatus, the measurement reply message including the data representative of the transmitted signal power level at the wireless communication apparatus of the measurement reply message.

In some embodiments, a wireless communication apparatus. The apparatus includes means for receiving at the wireless communication apparatus a request message sent from a mobile device, and means for transmitting from the wireless communication apparatus to the mobile device, in response to receiving the request message, a reply message including data representative of a transmitted signal power level at the wireless communication apparatus of the reply message. The reply message including the data representative of the transmitted signal power level at the wireless communication apparatus is configured to enable determination of a received signal power level at the mobile device of the reply message, and a round trip time from a first time instance when the request message was transmitted from the mobile device to a second time instance when the reply message was received at the mobile device.

Embodiments of the apparatus may include at least some of features described in the present disclosure, including at least some of the features described above in relation to the methods, the apparatus, and the computer readable media, as well as one or more of the following features.

The means for transmitting the reply message may include means for transmitting the reply message from the wireless communication apparatus with a highest signal power level permissible for the wireless communication apparatus.

The means for receiving the request message may include means for receiving by the wireless communication apparatus a positioning packet to facilitate determination of a geographical position of the mobile device.

The means for transmitting the reply message may include means for transmitting an acknowledgement message from the wireless communication apparatus in response to receiving the request message, with at least one of the received signal power level and the round trip time determined from the acknowledgement message, and means for transmitting a measurement reply message by the wireless communication apparatus, the measurement reply message including the data representative of the transmitted signal power level at the wireless communication apparatus of the measurement reply message.

In some embodiments, a non-transitory computer readable media is provided. The computer readable media is programmed with a set of instructions executable on a processor that, when executed, cause operations for communicating network information including receiving at an access point a request message sent from a mobile device, and in response to receiving the request message, transmitting, from the access point to the mobile device, a reply message including data representative of a transmitted signal power level at the access point of the reply message. The reply message including the data representative of the transmitted signal power level at the access point is configured to enable determination of a received signal power level at the mobile device of the reply message, and a round trip time from a first time instance when the request message was transmitted from the mobile device to a second time instance when the reply message was received at the mobile device.

Embodiments of the computer readable media may include at least some of features described in the present disclosure, including at least some of the features described above in relation to the methods, the apparatus, and the first computer readable media, as well as one or more of the following features.

The instructions to cause the operation of transmitting the reply message may include instructions to cause the operation of transmitting the reply message from the access point with a highest signal power level permissible for the access point.

The instructions to cause the operation of receiving the request message may include instructions to cause the operation of receiving by the access point a positioning packet to facilitate determination of a geographical position of the mobile device.

The instructions to cause the operation of transmitting the reply message may include instructions to cause the operations of transmitting an acknowledgement message from the access point in response to receiving the request message, with at least one of the received signal power level and the round trip time determined from the acknowledgement message, and transmitting a measurement reply message by the access point, the measurement reply message including the data representative of the transmitted signal power level at the access point of the measurement reply message.

As used herein, the term "mobile device," "mobile station," or "wireless device/station" may be any portable or movable device or machine that is configurable to acquire wireless signals transmitted from, and transmit wireless signals to, one or more wireless communication devices or networks. Thus, by way of example but not limitation, a mobile device may include a radio device, a cellular telephone device, a computing device, a personal communication system (PCS) device, a personal information manager (PIM), a personal digital assistant (PDA), laptop, tablet, or other like movable wireless communication equipped device, appliance, or machine, which is capable of receiving wireless communication and/or navigation signals. The above terms are also intended to include devices which communicate with a personal navigation device (PND), such as by short-range wireless, infrared, wire line connection, or other connection regardless of whether satellite signal reception, assistance data reception, and/or position-related processing occurs at the device or at the PND. Also, the above terms are intended to include all devices, including wireless communication devices, computers, laptops, etc., which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device," "mobile station," or "wireless device/station."

As used herein, the abbreviated term "wireless access point" (WAP) may be used to refer to a LAN-WAP and/or a WAN-WAP. Specifically, in the description presented below, when the term "WAP" is used, it should be understood that embodiments may include a mobile device that can exploit signals from a plurality of LAN-WAPs, a plurality of WAN-WAPs, or any combination of the two. The specific type of WAP being utilized by the mobile device may depend upon the environment of operation. Moreover, the mobile device may dynamically select between the various types of WAPs in order to arrive at an accurate position solution.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Described herein are methods, systems, apparatus, and products, that include a method including transmitting a request message from a mobile device to an access point, and receiving, at the mobile device, a reply message transmitted from the access point in response to receiving the request message, the reply message including data representative of a transmitted signal power level at the access point of the reply message. The method also includes determining, based on the reply message, received at the mobile device, that includes the data representative of a transmitted signal power level at the access point of the reply message, at least a received signal power level at the mobile device of the reply message, and/or a round trip time from a first time instance when the request message was transmitted from the mobile device to a second time instance when the reply message was received at the mobile device. In some embodiments, the transmitted signal power level at the access point of the reply message. In some embodiments, when computing the round trip time, the time period required, at the access point, to process the request and send the reply is subtracted from the elapsed time from the first time instance when the request was transmitted from the mobile device to the second time instance when the reply message was received at the mobile device.

In some embodiments, the methods, systems, apparatus, and products described herein may also include receiving, at an access point, a request message sent from a mobile device, and in response to receiving the request message, transmitting, from the access point to the mobile device, a reply message including data representative of a transmitted signal power level at the access point of the reply message. The reply message (which includes the data representative of the transmitted signal power level at the access point of the reply message) is configured to enable determination of at least a received signal power level at the mobile device of the reply message, and/or a round trip time from a first time instance when the request message was transmitted from the mobile device to a second time instance when the reply message was received at the mobile device. The reply message can also be used to determine the transmitted signal power level of the reply message.

Figure 1:
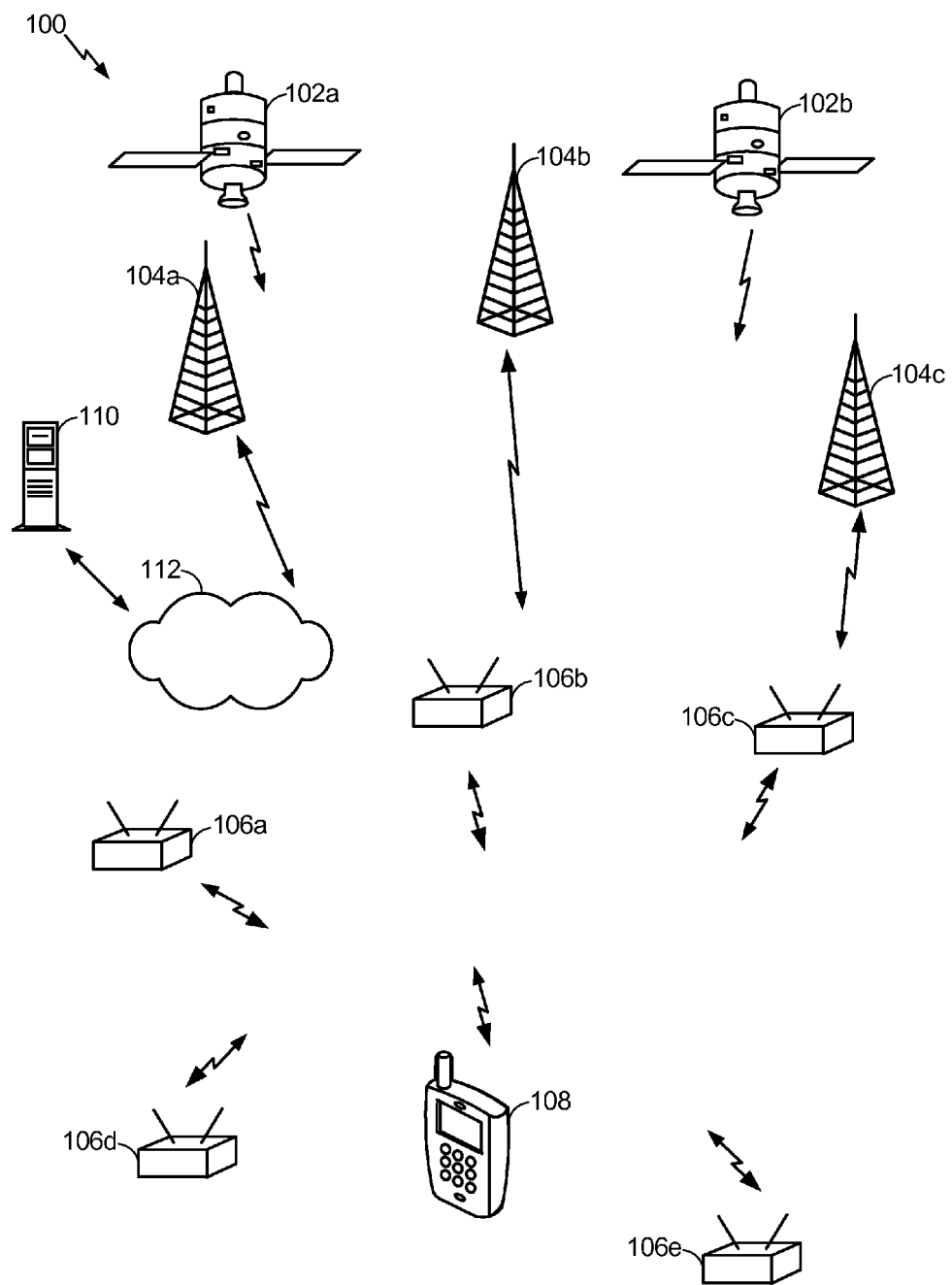
FIG. 1 is a schematic diagram of an example operating environment for a mobile device.

Thus, with reference to the drawings, FIG. 1 is a schematic diagram of an example operating environment 100 for a mobile device 108. The mobile device (also referred to as a wireless device or as a mobile station) 108 may be configured to operate and interact with multiple types of other communication systems/devices, including local area network devices (or nodes), wide area wireless network nodes, satellite communication systems, etc., and as such the mobile device 108 may include one or more interfaces to communicate with the various types of communications systems. As used herein, communication system/devices with which the mobile device 108 may communicate are also referred to as access points (AP's). The mobile device is also configured to determine its location (approximate location or substantially precise location) by communicating with one or more communication systems in its range to determine/measure, for example, parameters such as Round Trip Time (RTT) and/or Received Signal Strength Indicator (RSSI). In some implementations, and as will be described in greater details below, the various communication systems with which the mobile device 108 may communicate may be configured to transmit to the mobile device 108 information about the signal power transmitted by the various communication systems/nodes that are used by the mobile device 108 to enable more accurate determination of, for example, the mobile device's position (particularly in situations where the transmitting communication systems/nodes may perform dynamic power control operations, which consequently result in varying transmission power of signals transmitted by those systems/nodes).

The operating environment 100 may contain one or more different types of wireless communication systems or nodes. For example, the operating environment 100 may include Local Area Network Wireless Access Points (LAN-WAPs) 106a-e that may also be used for wireless voice and/or data communication, and may also be utilized as another independent source of position data. The LAN-WAPs 106 can be part of a Wireless Local Area Network (WLAN), which may operate in buildings and perform communications over smaller geographic regions than a WWAN. Additionally in some embodiments, the access points 106a-e could also be pico or femto cells that are part of a WWAN network. In some embodiments, the LAN-WAPs 106a-e may be part of, for example, WiFi networks (802.11x), cellular piconets and/or femtocells, Bluetooth Networks, etc. Although five (5) LAN-WAP access points are depicted in FIG. 1, any number of such LAN-WAP's may be used, and, in some embodiments, the operating environment 100 may include no LAN-WAPs access points at all, or may include a single LAN-WAP access point. Furthermore, each of the LAN-WAPs 106a-e depicted in FIG. 1 may be a movable node, or may be otherwise capable of being relocated.

Position of the mobile device 108 may be determined, in some implementations, using, for example, time-of-arrival techniques where approximate distances to the transmitting access points are determined based on received signals from the access points, and operations are performed on those determined distances to determine an approximate position. Each signal may be associated with its originating LAN-WAP based upon some form of identifying information that may be included in the received signal (such as, for example, a MAC address). The mobile device 108 may then derive the time delays associated with each of the received signals to obtain, for example, the RTT. In some implementations, the mobile device 108 may then form a message which can include the time delays and the identifying information of each of the LAN-WAPs, and send the message via network 112 to a positioning server 110. Based upon the received message, the positioning server may then determine a position of the mobile device 108. The positioning server 110 may generate and provide, for example, a Location Configuration Information (LCI) message to the base station that includes a pointer to the mobile device's position in a local coordinate system. When computing the position of the mobile device 108, the positioning server may take into account the different delays which can be introduced by elements within the wireless network. In some implementations, the position of the mobile device 108 may be determined at the mobile device 108 without having to transmit information (such as the RTT and RSSI associated with one or more access points, and/or the one or more access points' respective transmitted signal powers) to the positioning server 110. The device 108 may also measure the signal power/strength of the messages received from the access points and data regarding the signal power/strength at the point of origin (i.e., at the access point) to compute RSSI for those messages, determine approximate distances to the access points, and determine from that an approximate location of the mobile device.

The access points taking part in the position-determination process (e.g., any combination of the WAP nodes) may be configured to receive a request message (such as a positioning packet) sent from a mobile device, such as the mobile device 108, and in response to receiving the request message to transmitting a reply message including data representative of a transmitted signal power level (sometimes denoted as Tx) at the access point of the reply message. For example, the data representative of the signal transmission power of the reply message may include an actual power value encoded or included in the signal, a code representative of a power level that can be mapped to a power level using a look-up table stored at the mobile device, etc. In some embodiments, a wireless LAN access point may implement a communication scheme based on IEEE 802.11k standard that defines a series of measurement requests and provides Layer 1 and Layer 2 client statistics. Some of the measurements that the 802.11k amendment defines include Roaming decisions, radio frequency (RF) channel knowledge, hidden nodes, client statistics, and Transmit Power Control (TPC). Thus, an access point using, for example, an IEEE 802.11k-based implementation, may provide TPC information, relating to its transmission signal power, to a mobile device. As noted, transmitting the TPC information from an access point using an IEEE 802.11k-based implementation may be done in response to a request message sent by the mobile device (such as the mobile device 108). In some embodiments, an access point may be configured to transmit the reply message at its highest permissible power level, to thus increase the range and number of AP's with which the mobile device can communicate. Indications of the highest power levels may be included in the reply messages sent by the various access points with which the mobile device may communicate.

The reply message sent by the access point is configured to enable determination of the transmitted signal power level of the reply message, a received signal power level of the reply message at the mobile device, and a round trip time from a first time instance when a request message was transmitted from the mobile device to a second time instance when the reply message was received at the mobile device. Thus, in such embodiments, a single exchange of a single request message and at least one reply message can be used to provide the mobile device with at least three (3) pieces of information, namely, the time at which the reply signal from the access point arrived at the mobile device (also referred to as the time of arrival or TOA), the received signal strength at the mobile device of the reply message and the transmitted signal power at the access point. These three pieces of information can be used to determine, for example, the round trip time from a first time instance when the request message was transmitted from the mobile device to a second time instance when the reply message was received at the mobile device, and the RSSI. The transmitted power may be used with the computed RSSI to determine, for example, the location of the mobile device (e.g., based on a distance between the mobile device and the AP determined from the RSSI and Tx values), and/or the path loss associated with the reply message. As will be described in greater details below, in some embodiments, the access point may break-up the return communication responsive to the request message into two or more reply messages.

Based on the determined RSSI and/or the RTT determined in relation to the access point with which the mobile device completed the exchanged, and/or based on additional determined RTT and RSSI for additional access points, the position of the mobile device 108 may be determined. Generally, the determined received signal strength indicator and/or the RTT received from one or more access points (each of which may be identified by an access point identifier, such as a unique MAC address associated with the access point) can be used to determine an estimate of the device's location. For example, a database (which may be stored at the device 108 or at the positioning server 110) containing geographic locations, power profiles and RTT's for multiple access points with known geographical positions may be compared to currently determined RSSI and/or RTT values. Using these known positions, the relative distances of the device 108 to the access points may be determined and approximate geographic location of the device may be computed/derived (e.g., using trilateration operations). The Tx power included in the reply message may be used to more accurately determine the relative distance of the mobile device to the AP that sent the message. Further example embodiments of determining position of a mobile device based on such measurements as the RTT and/or RSSI are provided, for example, at U.S. patent application Ser. No. 12/622,289 (PG Pub. US 2010/0135178), entitled "Wireless Position Determination Using Adjusted Round Trip Time Measurements," the content of which is hereby incorporated by reference in its entirety. In some embodiments, the position of the mobile device may be also be determined, for example, by comparing the actual measured values of signal strength and RTT to a predicted value, and evaluating the probability of observing the measured RSSI/RTT at each of possible locations of the mobile device.

With continued reference to FIG. 1, the operating environment 100 may also include, in some embodiments, a plurality of one or more types Wide Area Network Wireless Access Points (WAN-WAPs) 104*a-c*, which may be used for wireless voice and/or data communication, and may also server as another source of independent information through which the mobile device 108 may determine its position/location. The WAN-WAPs 104*a-c* may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104*a*-104*c* within the WWAN may operate from fixed positions, and provide network coverage over large metropolitan and/or regional areas. Although three (3) WAN-WAPs are depicted in FIG. 1, any number of such WAN-WAPs may be used. In some embodiments, the operating environment 100 may include no WAN-WAPs at all, or may include a single WAN-WAP. Additionally, each of the WAN-WAPs 104 depicted in FIG. 1 may be a movable node, or may otherwise capable of being relocated.

Position determination techniques may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

When deriving position using the WLAN, the mobile device 108 may utilize time of arrival techniques, optionally with the assistance of a positioning server 110 and a network 112. Thus, the mobile device 108 may be configured to determine position information using WAN-WAPs 104 which may include WAPs of different types (e.g., cellular base stations, WiMax base stations, etc.) In such an operating environment, the mobile device 108 may be able to use the signals from each different type of WAN-WAP to improve accuracy. The positioning server 110 may communicate with the mobile device 108 through the network 112. In some embodiments, at least one WLAN-WAP access point configured to establish a communication link with the mobile device to enable position determination of the mobile device may be configured to send a message to the mobile device 108, in response to a request message from the mobile device 108, that includes at least information representative of the signal transmission power at the access point (e.g., an actual power value encoded or included in the signal, a code representative of a power level that can be mapped to a power level using a look-up table stored at the mobile device, etc.) Such a reply message, which includes the information representative of the signal transmission power at the access point, can be used to determine, at the mobile device 108, the transmission power at the access point, the RTT, and/or the RSSI.

In some embodiments, and as further depicted in FIG. 1, the mobile device 108 may also be configured to at least receive information from a Satellite Positioning System (SPS) 102, which may be used as an independent source of position information for the mobile device 108. The mobile device 108 may thus include one or more dedicated SPS receivers specifically designed to receive signals for deriving geo-location information from the SPS satellites. Thus, in some embodiments, the mobile device 108 may derive position information from any one or a combination of the SPS satellites 102, the WAN-WAPs 104, and/or the LAN-WAPs 106. Each of the aforementioned systems can provide an independent information estimate of the position for the mobile device 108 using different techniques. In some embodiments, the mobile device may combine the solutions derived from each of the different types of access points to improve the accuracy of the position data.

In embodiments in which the mobile device 108 can receive satellite signals, the mobile device may utilize a receiver specifically implemented for use with the SPS that extracts position data from a plurality of signals transmitted by SPS satellites 102. Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

Figure 2A:
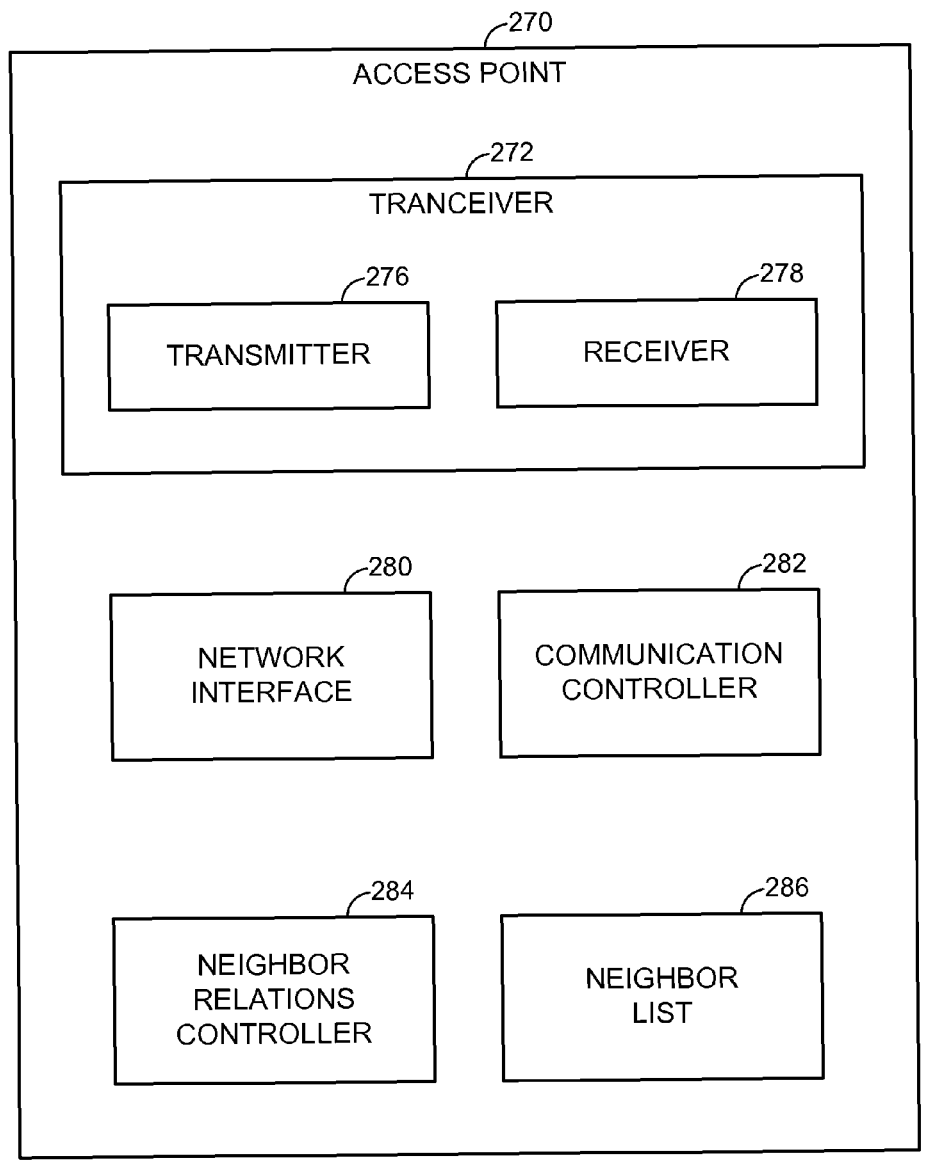
FIG. 2A is a schematic diagram of an example access point.

With reference now to FIG. 2A, a schematic diagram of an example access point 270, which may be similar to and be configured to have a functionality similar to that, of any of the various access points depicted in FIG. 1, is shown. The access point 270 may include a transceiver 272 for communicating with wireless nodes, such as, for example, the mobile device 108 of FIG. 1. The transceiver 272 may include a transmitter 276 for sending signals (e.g., downlink messages) and a receiver 278 for receiving signals (e.g., uplink messages). Similarly, the access point 270 may include a network interface 280 to communicate with other network nodes (e.g., sending and receiving queries and responses). For example, each network element may be configured to communicate (e.g., wired or wireless backhaul communication) with a gateway, or other suitable entity of a network, to facilitate communication with one or more core network nodes (e.g., any of the other access points shown in FIG. 1, the positioning server 110, and/or other network devices or nodes). Additionally and/or alternatively, communication with other network nodes may also be performed using the transceiver 272.

The access point 270 may also include other components that may be used in conjunction with communication exchanges described herein. For example, the access point 270 may include, in some embodiments, a communication controller 282 to manage communications with other nodes (e.g., sending and receiving messages) and to provide other related functionality. In addition, the access point 270 may include neighbor relations controllers (e.g. neighbor discovery modules) 284 to manage neighbor relations (e.g., maintaining a neighbor list 286) and to provide other related functionality. The communication controller may be implemented, in some embodiments, as a processor-based device, with a configuration and functionality similar to that shown and described in relation to FIG. 7.

The access point 270 may thus be configured, as more particularly described below, to receive at an access point a request message sent from a mobile device, and in response to receiving the request message, to transmit to the mobile device a reply message including data representative of a transmitted signal power level of the reply message at the access point. Such a transmitted reply message may be configured to enable determination of the transmitted signal power level of the reply message, a received signal power level of the reply message at the mobile device, and a round trip time from a first time instance when the request message was transmitted from the mobile device to a second time instance when the reply message was received at the mobile device.

Figure 2B:
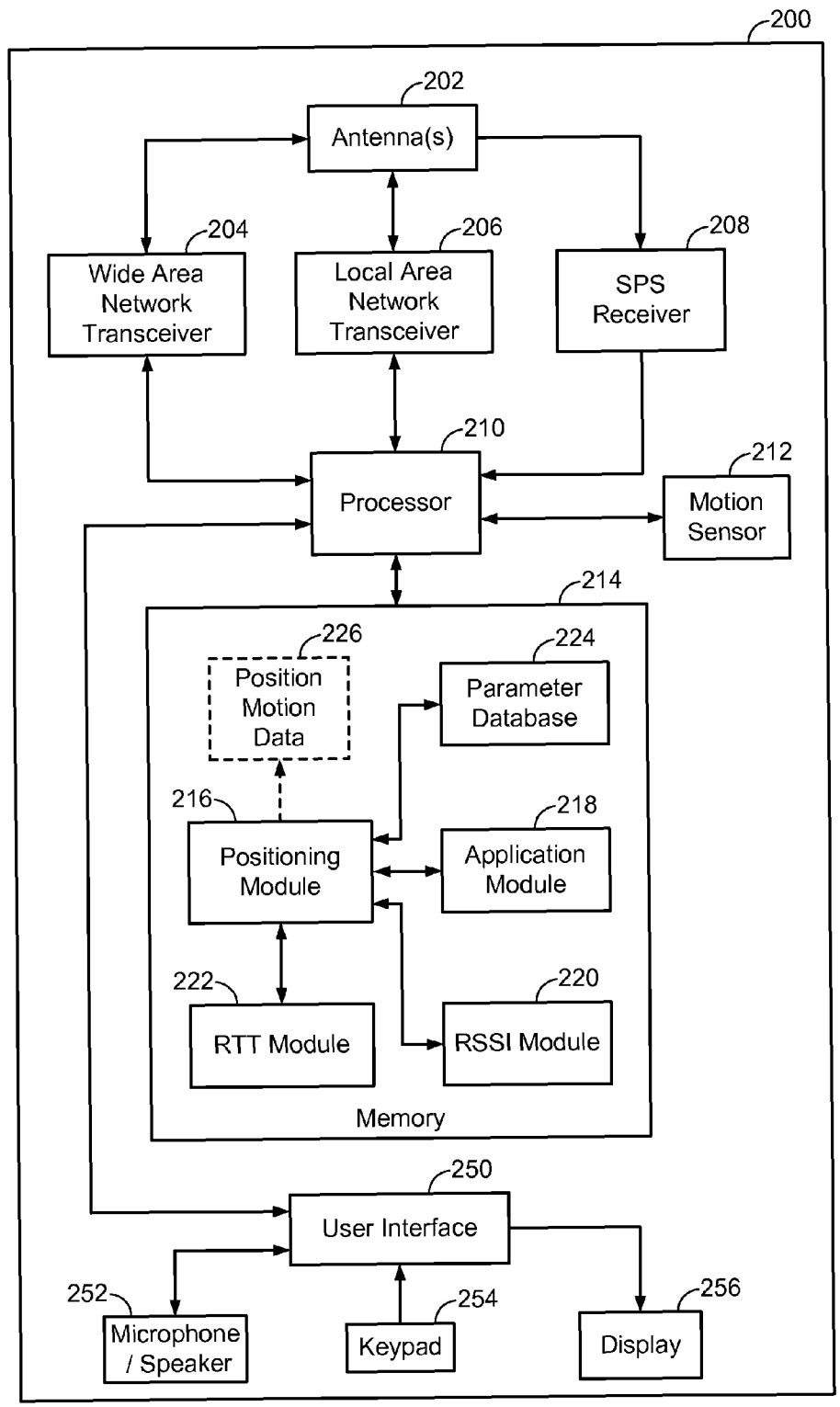
FIG. 2B is schematic diagram illustrating various components of an example mobile device.

With reference to FIG. 2B, a schematic diagram illustrating various components of an example mobile device 200, which may be similar to the mobile device 108 of FIG. 1, is shown. For the sake of simplicity, the various features/components/functions illustrated in the box diagram of FIG. 2B are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 2B may be further subdivided, or two or more of the features or functions illustrated in FIG. 2B may be combined. Additionally, one or more of the features or functions illustrated in FIG. 2B may be excluded.

As shown, the mobile device 200 may include one or more local area network transceivers 206 that may be connected to one or more antennas 202. The local area network transceiver 206 comprises suitable devices, hardware, and/or software for communicating with and/or detecting signals to/from one or more of the LAN-WAPs 106a-e depicted in FIG. 1, and/or directly with other wireless devices within a network. In some embodiments, the local area network transceiver 206 may comprise a WiFi (802.11x) communication system suitable for communicating with one or more wireless access points; however, in some embodiments, the local area network transceiver 206 may comprise other types of local area network, personal area networks (e.g., Bluetooth), etc. Additionally, any other type of wireless networking technologies may be used, for example, Ultra Wide Band, ZigBee, wireless USB, etc.

The mobile device 200 may also include, in some implementations, one or more wide area network transceiver(s) 204 that may be connected to the one or more antennas 202. The wide area network transceiver 204 may comprise suitable devices, hardware, and/or software for communicating with and/or detecting signals to/from one or more of the WAN- WAPs 104*a-c* illustrated in FIG. 1, and/or directly with other wireless devices within a network. In some implementations, the wide area network transceiver 204 may comprise a CDMA communication system suitable for communicating with a CDMA network of wireless base stations. In some implementations, the wireless communication system may comprise another type of cellular telephony network, such as, for example, TDMA or GSM. Additionally, any other type of wireless networking technologies may be used, for example, WiMax (802.16), etc.

In some embodiments, an SPS receiver 208 may also be included in mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the mobile device's 200 position using, in part, measurements obtained by any suitable SPS procedure.

In some embodiments, a motion sensor 212 may be coupled to a processor 210 to provide relative movement and/or orientation information which is independent of motion data derived from signals received by the wide area network transceiver 204, the local area network transceiver 206 and the SPS receiver 208. By way of example but not limitation, motion sensor 212 may utilize an accelerometer (e.g., a MEMS device), a gyroscope, a geomagnetic sensor (e.g., a compass), an altimeter (e.g., a barometric pressure altimeter), and/or any other type of sensor. Moreover, motion sensor 212 may include a plurality of different types of devices and combine their outputs in order to provide motion information.

The processor (also referred to as a controller) 210 may be connected to the local area network transceiver 206, the wide area network transceiver 204, the SPS receiver 208 and the motion sensor 212. The processor may include one or more microprocessors, microcontrollers, and/or digital signal processors that provide processing functions, as well as other calculation and control functionality. The processor 210 may also include memory 214 for storing data and software instructions for executing programmed functionality within the mobile device. The memory 214 may be on-board the processor 210 (e.g., within the same IC package), and/or the memory may be external memory to the processor and functionally coupled over a data bus. Further details regarding an example embodiment of a processor or computation system, which may be similar to the processor 210, are provided below in relation to FIG. 7.

A number of software modules and data tables may reside in memory 214 and be utilized by the processor 210 in order to manage both communications with remote devices/nodes (such as the various access points depicted in FIG. 1) and positioning determination functionality. As illustrated in FIG. 2B, memory 214 may include a positioning module 216, an application module 218, a received signal strength indicator (RSSI) module 220, and/or a round trip time (RTT) module 222. It is to be noted that the functionality of the modules and/or data structures may be combined, separated, and/or be structured in different ways depending upon the implementation of the mobile device 200.

The application module 218 may be a process running on the processor 210 of the mobile device 200, which requests position information from the positioning module 216. Applications typically run within an upper layer of the software architectures, and may include indoor navigation applications, shopping applications, location aware service applications, etc. The positioning module 216 may derive the position of the mobile device 200 using information derived from the RTTs. As noted, in some embodiments, position determination may be performed by a remote server such as the positioning server 110 of FIG. 1. In order to accurately determine position using RTT techniques, reasonable estimates of processing time delays introduced by each WAP may be used to calibrate/adjust the measured RTTs. The measured RTTs may be determined by the RTT module 222, which can measure the timings of signals exchanged between the mobile device 200 and the WAPs to derive round trip time (RTT) information. In some embodiments, once measured, the RTT values may be passed to the positioning module 216 to assist in determining the position of the mobile device 200.

Other information that may be determined from communications received by the mobile device 200 (e.g., using one of its transceivers) includes the received signal power, which may be represented in the form of RSSI (determined using the RSSI module 220). The RSSI module 220 may provide statistical information regarding the signals to the positioning module 216. When using RSSI measurements to determine a mobile device's position, appropriate calibration/adjustment procedures may need to be performed. A determined position of the mobile device 200 may then be provided to the application module 218.

In some embodiments, the mobile device 200 may also be configured to receive supplemental information that includes auxiliary position and/or motion data which may be determined from other sources. Such auxiliary position data may be incomplete or noisy, but may be useful as another source of independent information for estimating the processing times of the WAPs. As illustrated in FIG. 2B (using dashed lines), mobile device 200 may optionally store auxiliary position/motion data 226 in memory which may be derived from information received from other sources as described below. Supplemental information may also include, but not be limited to, information that can be derived or based upon Bluetooth signals, beacons, RFID tags, and/or information derived from map (e.g., receiving coordinates from a digital representation of a geographical map by, for example, a user interacting with a digital map).

The mobile device 200 may further include a user interface 250 which provides any suitable interface systems, such as a microphone/speaker 252, keypad 254, and display 256 that allows user interaction with the mobile device 200. The microphone/speaker 252 provides for voice communication services using the wide area network transceiver 204 and/or the local area network transceiver 206. The keypad 254 comprises any suitable buttons for user input. The display 256 comprises any suitable display, such as, for example, a backlit LCD display, and may further include a touch screen display for additional user input modes.

As noted, a mobile device and an access point (e.g., a LAN-type wireless access point, a WAN-type wireless access point) may implement a compact communication exchange, which in some embodiments may include a single request message and a reply message, and based on that compact exchange of messages, information to enable computation of the location of the mobile device may be determined.

Figure 3:
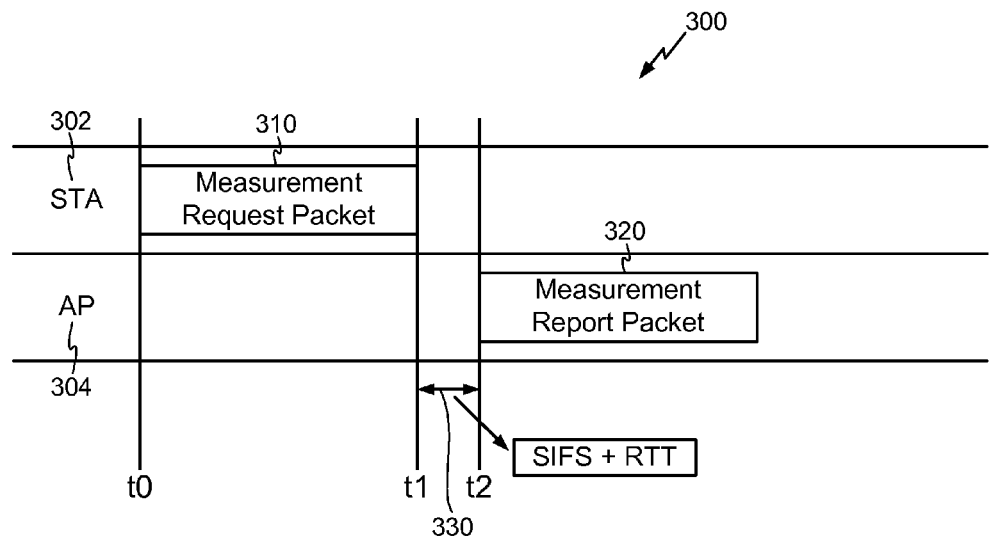
FIG. 3 is a signal flow diagram of an example communication exchange to enable determination of RTT, RSSI, and an access point's transmission power.
Figure 4:
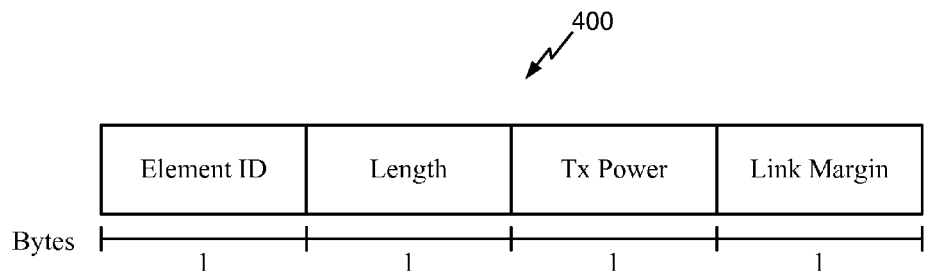
FIG. 4 is an example TPC report element message packet.

Thus, with reference to FIG. 3, a signal flow diagram of an example communication exchange 300 to enable determination of RTT, RSSI, and/or an access point's transmission power (Tx) is shown. A mobile device 302 (also referred to as a station, or STA) transmits a request message 310, identified in FIG. 3 as a measurement request packet, to an access point 304. The mobile device 302 may be similar to the mobile devices 108 and/or 200 shown and described in relation to FIGS. 1 and 2B, respectively. In some implementations, the communication exchange may be based on such wireless communication exchange protocols as 802.11k, which provides transmit power control (TPC) functionality in which an access point may transmit a TPC report element message packet (e.g., packet 400 shown in FIG. 4) that includes data representative of the signal power level transmitted by the access point. In some implementations, the request message may include a positioning packet to facilitate determination of a geographical position of the mobile device.

With continued reference to FIG. 3, in response to receiving the request message 310, the AP 304 transmits at least one reply message 320, identified in FIG. 3 as a measurement report packet. The reply message includes data representative of a transmitted signal power. As noted, the data representative of the transmitted signal power may include an actual power value encoded or included in the reply message, a code representative of a power level that can be mapped to a power level using a look-up table stored at the mobile device, etc. For example, in implementations of the reply message based on the 802.11k protocol, the data representative of the transmitted power signal could be encoded in the "Tx Power" field of the packet 400 depicted in FIG. 4. The mobile device (STA) 302 that initiated the exchange receives the reply message that includes the data representative of transmitted signal power level from the AP. As noted, in some embodiments, the access point with which the mobile device is communicating may be configured to transmit the reply message at its highest permissible power level, to thus increase the range and number of access points with which the mobile device can communicate. Indications of the highest power levels are included in the reply messages sent by the various access points with which the mobile device may communicate. Using the highest permissible power level to transmit reply messages so as to increase the number of AP's that can transmit such reply messages enables, for example, a more accurate position determination for the mobile device based on the measurements of RSSI, RTT, and/or the Tx determined from the reply messages.

As described herein, the RTT can be computed based on the time instance when the request message was sent and the time instance when the reply message was received, and taking into account any short interframe space (SIFS) which is the time period between receipt of a data frame (in this case, the request message) and the transmission of an acknowledgement, or reply message, by the AP. An arrow 330 in FIG. 3 identifies an interval corresponding to SIFS+RTT. The transmission power may be determined, for example, based on the value provided in the received reply message. In some embodiments, an actual transmission power level used by the access point may be provided in the reply message. In some embodiments, a coded indication may be used to identify the transmission power level, and the coded indication may then be cross-referenced to a lookup table at the mobile device, or at some other remote device (e.g., the positioning server 110 of FIG. 1), to match the code to listed power levels.

The RSSI may be determined, for example, based on the measured received signal power of the reply message. Additionally, because the received reply message also includes, or indicates, the transmit power of the access point that transmitted the reply message, the RSSI computed from the reply message and the transmit power received in the reply message may be used to determine the path loss (e.g., the signal power attenuation) associated with the reply message, and/or determine the distance of the mobile device to the access point using, for example, the relationship:

$$\mu_{RSSI} = AP_{TxPower} - (\alpha + 10 \times \beta \log_{10}(\text{distance}))$$

where $\mu_{RSSI}$ is the computed RSSI parameter, $AP_{TxPower}$ is the transmission power at the access point, distance is the distance of the measuring device (e.g., the mobile device) to the access point, and $\alpha$ and $\beta$ are experimentally determined parameters.

Additionally and/or alternatively, the RSSI and the transmitted power of the transmitting access point can be utilized in a heat map to predict position of the mobile device.

The procedure 300 depicted in FIG. 3 may be performed for multiple access points with which the mobile device 302 can communicate. Once the procedure 300 has been performed for a sufficient number of access points (which may be a predetermined number of access points), or with all the access points within the mobile device's range, the determined values of RTT, RSSI, and/or Tx (determined from received reply messages) corresponding to the respective participating access points may be used to determine the position of the mobile device (e.g., using stored signal fingerprint data, by performing multilateration position determination procedures, etc.)

Examples of messages that may be used in the communication exchanges described herein include, for example, messages based on 802.11k protocol, messages formatted based on Cisco's CCX™ (Cisco Compatible Extensions) messages, messages formatted based on QUIPS™ messages, etc.

Figure 5:
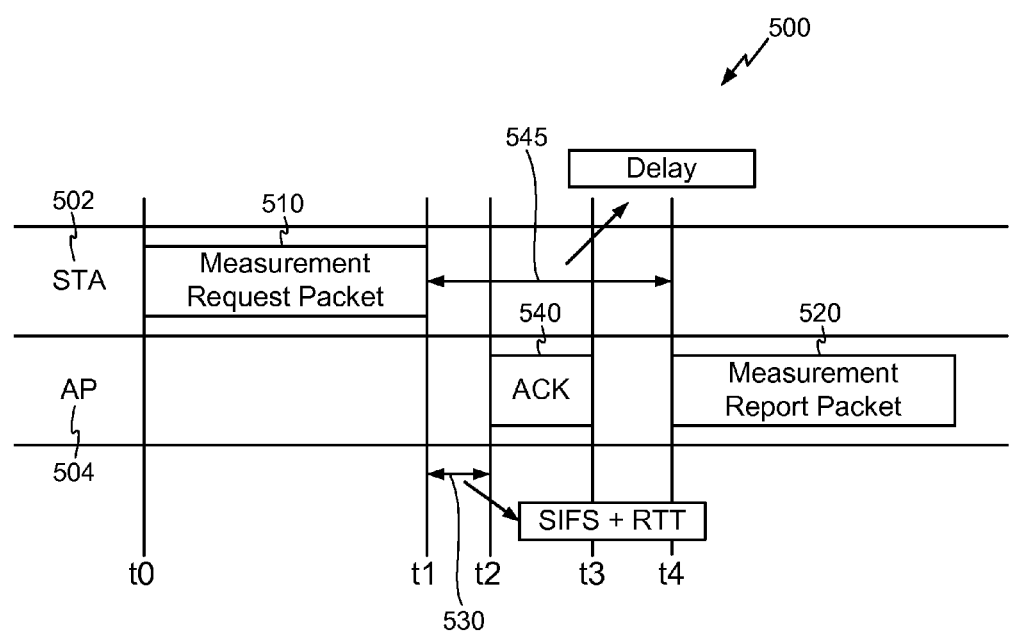
FIG. 5 is a signal flow diagram of another example communication exchange to enable determination of RTT, RSSI, and an access point's transmission power.

FIG. 5 is a signal flow diagram of another example communication exchange 500 to enable determination of RTT, RSSI, and an access point's transmission power. In the example communication exchange 500 there may be a delay (which may greater than a SIFS delay 530) in determining (e.g., measuring) the transmission power level. An example of such a delay is depicted in FIG. 5 as interval 545. In such situations, it may be necessary to send an acknowledgement signal to the mobile device to provide more time for the access point to determine the transmission power level, generate the reply message that includes data representative of the transmitted signal power level at the AP, and transmit that reply message to the mobile device. Thus, in such implementations, receiving the reply message at the mobile device (STA) 502 may include receiving an acknowledgement message 540 transmitted from an access point in response to receiving a request message 510 sent by the mobile device, and receiving a second reply message 520 (also referred to as a measurement reply message) responsive to the request message, transmitted by the access point, that includes the data representative of a transmitted signal power level of the measurement reply message at the AP. The received signal power level and the round trip time may be determined, in such implementations, from the acknowledgement message rather than from the measurement reply message. The Tx power can then be determined from the reply message. The determined Tx can be used with the RSSI to determine, for example, the distance of the mobile device to the access point that transmitted the acknowledgement and reply messages. The determined distance from the transmitting AP, together with additional distance values determined from other reply messages may be used to determine a mobile's device position.

Figure 6A:
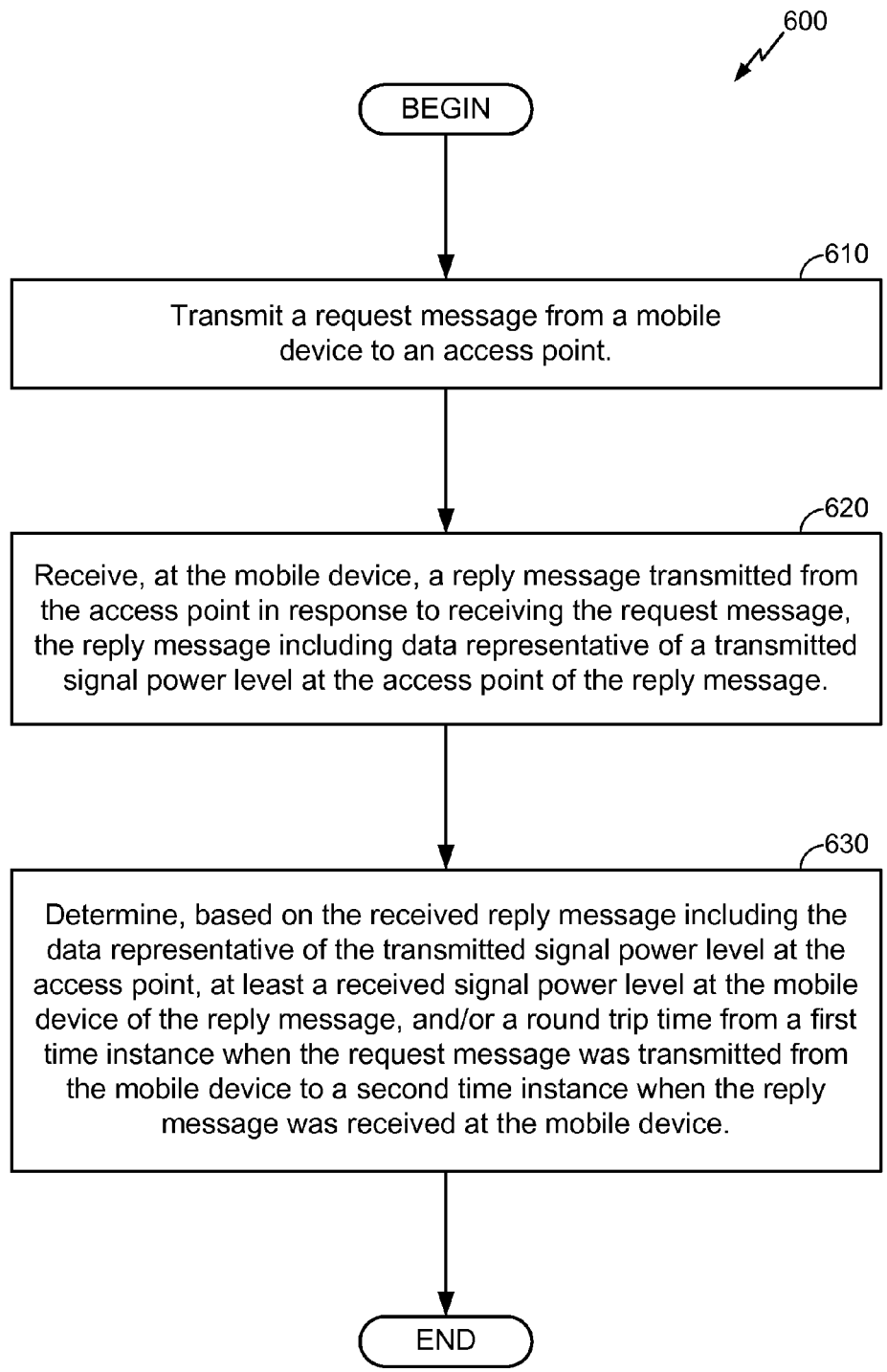
FIG. 6A is a flowchart of an example procedure, generally performed by a mobile device, to obtain measurement information from an access point.

With reference to FIG. 6A, a flowchart of an example procedure 600 for communicating network information to, for example, obtain measurement information from an access point to facilitate determination of a location of a mobile device (such as the mobile device 108 of FIG. 1) is shown. The operations of the procedure 600 are operations that are generally performed at the mobile device. Particularly, the mobile device transmits 610 a request message, which may be a positioning packet, to an access point, such as any of the LAN wireless access points 106a-e depicted in FIG. 1. In some embodiments, the mobile device may be configured to perform the communication exchanges described herein with other types of access points, such as, for example, WAN wireless access points (e.g., the access points 104a-c of FIG. 1). Having transmitted a request message, a reply message transmitted from the access point in response to receiving the request message is received 620 at the mobile device. The reply message includes data representative of a transmitted signal power level at the access point of the reply message.

Based on the reply message, received at the mobile device, that includes the data representative of the transmitted signal power level at the access point, a determination is made 630 of at least a received signal power level, at the mobile device, of the reply message (e.g., by measuring the signal amplitude of the received reply message and/or computing RSSI), and/or a round trip time from a first time instance when the request message was transmitted from the mobile device to a second time instance when the reply message was received at the mobile device (e.g., by starting a timer after sending the request message). In some embodiments, a further determination is made, based on the received reply message, of the transmitted signal power level of the reply message (e.g., by accessing a value included in the reply message), In some embodiments, the received reply message may include at least two separate messages, for example, in situations where the delay at the access point for measuring or otherwise determining the transmission power is too long. Therefore, an acknowledgement message is sent to the mobile device prior to sending a subsequent message that includes the transmission signal power. Thus, in such embodiments, receiving the reply message may include receiving an acknowledgement message transmitted from the access point in response to receiving the request message, and receiving a second reply message (also referred to as a measurement reply message) transmitted by the access point.

Figure 6B:
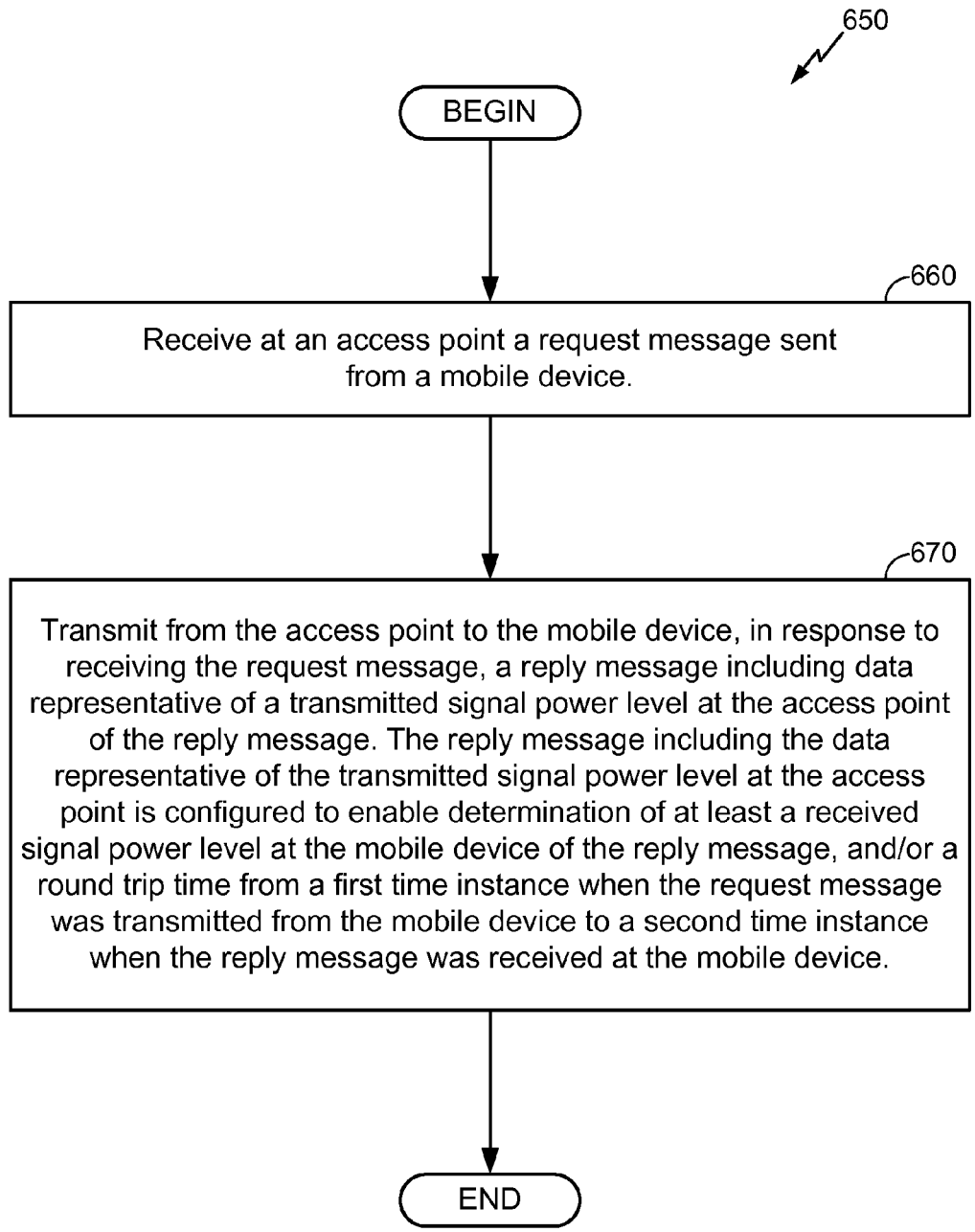
FIG. 6B is a flowchart of an example procedure, generally performed by an access point, to provide measurement information from the access point.

FIG. 6B is a flowchart of an example procedure 650 to provide information from an access point. The operations of the procedure 650 are operations that are generally performed at the access point. Thus, a request message sent from a mobile device is received 660 at an access point. In response to receiving the request message, a reply message including data representative of a transmitted signal power level at the access point of the reply message is transmitted 670 from the access point to the mobile device. As noted, the reply message, which includes the data representative of the transmitted signal power level at the access point, is configured to enable determination of at least a received signal power level of the reply message at the mobile device, and/or a round trip time from a first time instance when the request message was transmitted from the mobile device to a second time instance when the reply message was received at the mobile device. In some embodiments, the reply message may further be configured to enable determination of the transmitted signal power level of the reply message at the access point.

Figure 7:
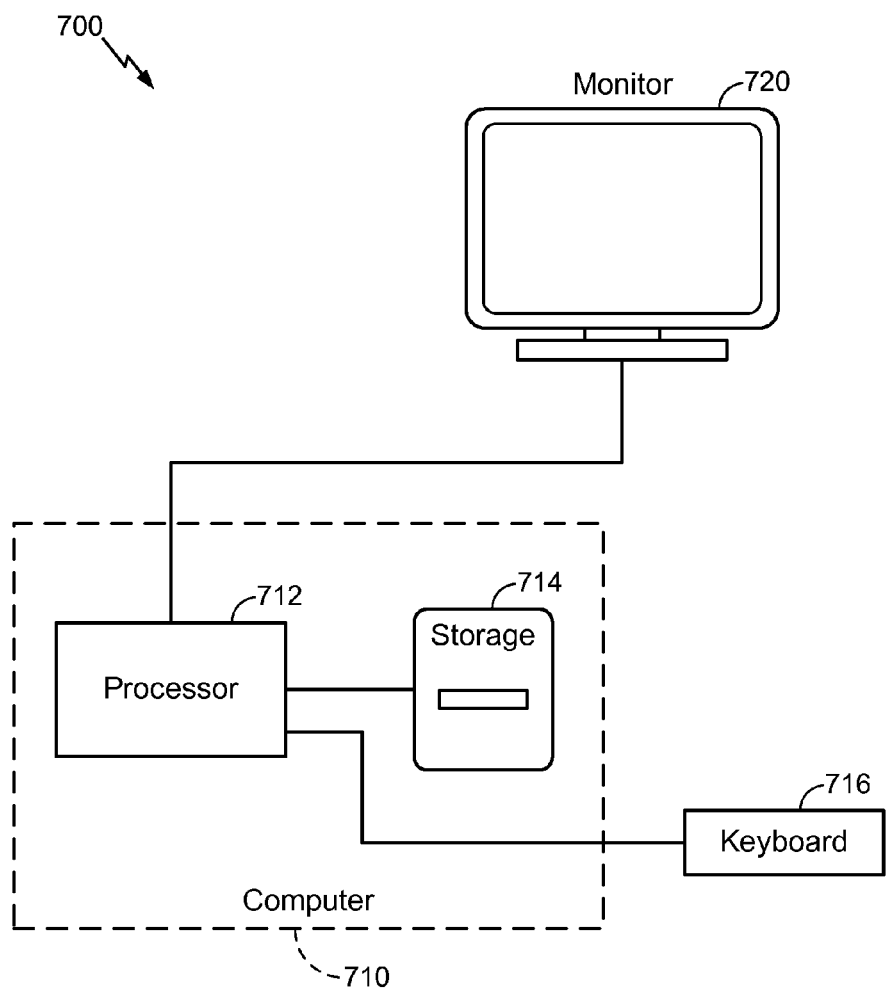
FIG. 7 is a schematic diagram of a generic computing system.

Performing the communication exchange procedures, the measurement data processing, and location determination procedures described herein may be facilitated by a processor-based computing system. With reference to FIG. 7, a schematic diagram of an example computing system 700 is shown. The computing system 700 includes a processor-based device 710 such as a personal computer, a specialized computing device, and so forth, that typically includes a central processor unit 712. In addition to the CPU 712, the system includes main memory, cache memory and bus interface circuits (not shown). The processor-based device 710 may include a mass storage device 714, such as a hard drive and/or a flash drive associated with the computer system. The computing system 700 may further include a keyboard, or keypad, 716, and a monitor 720, e.g., a CRT (cathode ray tube) or LCD (liquid crystal display) monitor, that may be placed where a user can access them (e.g., a mobile device's screen).

The processor-based device 710 is configured to facilitate, for example, the implementation of the communication exchange procedure between a mobile device and one or more access points, to determine data pertaining to the communication exchange (e.g., RTT, RSSI, Tx, etc.), and/or to determine the location of the mobile device based on such determined data. The mass storage device 714 may thus include a computer program product that when executed on the processor-based device 710 causes the processor-based device to perform operations to facilitate the implementation of the above-described procedures. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 700. Other modules that may be included with the processor-based device 710 are speakers, a sound card, a pointing device, e.g., a mouse or a trackball, by which the user can provide input to the computing system 700. The processor-based device 710 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for communicating network information, the method comprising:
   transmitting a request message from a mobile device to an access point;
   receiving, at the mobile device, a reply message transmitted from the access point in response to receiving the request message, the reply message including data representative of a transmitted signal power level at the access point of the reply message; and
   determining, based, at least in part, on the received reply message including the data representative of the transmitted signal power level at the access point, a received signal power level at the mobile device of the reply message, a round trip time derived from measured timing signals corresponding to a first time instance when the request message was transmitted from the mobile device and a second time instance when the reply message including the data representative of the transmitted signal power level at the access point was received at the mobile device, and a path loss associated with the reply message or a distance between the mobile device and the access point or combination thereof, the path loss or the distance or the combination thereof computed based on the received signal power determined from the reply message and the data representative of the access point transmitted signal power level included in the reply message.

2. The method of claim 1, further comprising:
   determining, based on the received reply message, the transmitted signal power level of the reply message at the access point.

3. The method of claim 1, further comprising:
   determining based on the determined received signal power level of the reply message a received signal strength indication (RSSI).

4. The method of claim 1, wherein receiving the reply message comprises:
   receiving the reply message transmitted from the access point with a highest signal power level permissible for the access point.

5. The method of claim 1, wherein transmitting the request message comprises:
   transmitting by the mobile device a positioning packet to facilitate determination of a geographical position of the mobile device.

6. The method of claim 1, further comprising:
   measuring the received signal power level of the reply message upon receipt of the reply message at the mobile device.

7. The method of claim 1, wherein receiving the reply message comprises:
   receiving an acknowledgement message transmitted from the access point in response to receiving the request message, wherein at least one of the received signal power level and the round trip time are determined from the acknowledgement message; and
   receiving a measurement reply message transmitted by the access point, the measurement reply message including the data representative of the transmitted signal power level at the access point of the measurement reply message.

8. The method of claim 1, wherein the reply message includes a packet formatted based on a TPC Report Element message of an 802.11k protocol.

9. The method of claim 1, wherein the reply message includes one or more of: a packet formatted based on CISCO COMPATIBLE EXTENSIONS™ (CCX™) messages protocol, and a packet formatted based on QUIPS™ messages.

10. A wireless communication apparatus comprising:
    a transceiver to transmit and receive communication messages; and
    a processor-based device configured to cause operations comprising:
    transmitting a request message from the wireless communication apparatus to an access point,
    receiving, at the wireless communication apparatus, a reply message transmitted from the access point in response to receiving the request message, the reply message including data representative of a transmitted signal power level at the access point of the reply message, and
    determining, based, at least in part, on the received reply message including the data representative of the transmitted signal power level at the access point, a received signal power level at the wireless communication apparatus of the reply message, a round trip time derived from measured timing signals corresponding to a first time instance when the request message was transmitted from the wireless communication apparatus and a second time instance when the reply message including the data representative of the transmitted signal power level at the access point was received at the wireless communication apparatus, and a path loss associated with the reply message or a distance between the wireless communication apparatus and the access point or combination thereof, the path loss or the distance or the combination thereof computed based on the received signal power determined from the reply message and the data representative of the access point transmitted signal power level included in the reply message.

11. The wireless communication apparatus of claim 10, wherein the processor-based device is further configured to cause the operations of:
determining based on the determined received signal power level of the reply message a received signal strength indication (RSSI).

12. The wireless communication apparatus of claim 10, wherein the processor-based device configured to cause the operations of receiving the reply message is configured to cause the operations of:
receiving the reply message transmitted from the access point with a highest signal power level permissible for the access point.

13. The wireless communication apparatus of claim 10, wherein the processor-based device configured to cause the operations of transmitting the request message is configured to cause the operations of:
transmitting by the wireless communication apparatus a positioning packet to facilitate determination of a geographical position of the wireless communication apparatus.

14. The wireless communication apparatus of claim 10, wherein the processor-based device configured to cause the operations of receiving the reply message is configured to cause the operations of:
receiving an acknowledgement message transmitted from the access point in response to receiving the request message, wherein at least one of the received signal power level and the round trip time are determined from the acknowledgement message; and
receiving a measurement reply message transmitted by the access point, the measurement reply message including the data representative of the transmitted signal power level at the access point of the measurement reply message.

15. The wireless communication apparatus of claim 10, wherein the reply message includes a packet formatted based on a TPC Report Element message of an 802.11k protocol.

16. A wireless communication apparatus, comprising:
means for transmitting a request message from the wireless communication apparatus to an access point;
means for receiving, at the wireless communication apparatus, a reply message transmitted from the access point in response to receiving the request message, the reply message including data representative of a transmitted signal power level at the access point of the reply message; and
means for determining, based, at least in part, on the received reply message including the data representative of the transmitted signal power level at the access point, a received signal power level at the wireless communication apparatus of the reply message, a round trip time derived from measured timing signals corresponding to a first time instance when the request message was transmitted from the wireless communication apparatus and a second time instance when the reply message including the data representative of the transmitted signal power level at the access point was received at the wireless communication apparatus, and a path loss associated with the reply message or a distance between the wireless communication apparatus and the access point or combination thereof, the path loss or the distance or the combination thereof computed based on the received signal power determined from the reply message and the data representative of the access point transmitted signal power level included in the reply message.

17. The wireless communication apparatus of claim 16, further comprising:
means for determining based on the determined received signal power level of the reply message a received signal strength indication (RSSI).

18. The wireless communication apparatus of claim 16, wherein the means for receiving the reply message comprise:
means for receiving the reply message transmitted from the access point with a highest signal power level permissible for the access point.

19. The wireless communication apparatus of claim 16, wherein the means for transmitting the request message comprise:
means for transmitting by the wireless communication apparatus a positioning packet to facilitate determination of a geographical position of the wireless communication apparatus.

20. The wireless communication apparatus of claim 16, wherein the means for receiving the reply message comprise:
means for receiving an acknowledgement message transmitted from the access point in response to receiving the request message, wherein at least one of the received signal power level and the round trip time are determined from the acknowledgement message; and
means for receiving a measurement reply message transmitted by the access point, the measurement reply message including the data representative of the transmitted signal power level at the access point of the measurement reply message.

21. The wireless communication apparatus of claim 16, wherein the reply message includes a packet formatted based on a TPC Report Element message of an 802.11k protocol.

22. A non-transitory computer readable media programmed with a set of instructions executable on a processor that, when executed, cause operations for communicating network information comprising:
transmitting a request message from a mobile device to an access point;
receiving, at the mobile device, a reply message transmitted from the access point in response to receiving the request message, the reply message including data representative of a transmitted signal power level at the access point of the reply message; and
determining, based, at least in part, on the received reply message including the data representative of the transmitted signal power level at the access point, a received signal power level at the mobile device of the reply message, a round trip time derived from measured timing signals corresponding to a first time instance when the request message was transmitted from the mobile device and a second time instance when the reply message including the data representative of the transmitted signal power level at the access point was received at the mobile device, and a path loss associated with the reply message or a distance between the mobile device and the access point or combination thereof, the path loss or the distance or the combination thereof computed based on the received signal power determined from the reply message and the data representative of the access point transmitted signal power level included in the reply message.

23. The computer readable media of claim 22, wherein the set of instructions further comprises instructions that cause the operations of:

determining based on the determined received signal power level of the reply message a received signal strength indication (RSSI).

24. The computer readable media of claim 22, wherein the instructions to cause the operations of receiving the reply message comprise instructions to cause the operations of:
receiving the reply message transmitted from the access point with a highest signal power level permissible for the access point.

25. The computer readable media of claim 22, wherein the instructions to cause the operations of transmitting the request message comprise instructions to cause the operations of:
transmitting by the mobile device a positioning packet to facilitate determination of a geographical position of the mobile device.

26. The computer readable media of claim 22, wherein the instructions to cause the operations of receiving the reply message comprise instructions to cause the operations of:
receiving an acknowledgement message transmitted from the access point in response to receiving the request message, wherein at least one of the received signal power level and the round trip time are determined from the acknowledgement message; and
receiving a measurement reply message transmitted by the access point, the measurement reply message including the data representative of the transmitted signal power level at the access point of the measurement reply message.

27. The computer readable media of claim 22, wherein the reply message includes a packet formatted based on a TPC Report Element message of an 802.11k protocol.

28. A method for communicating network information, the method comprising:
receiving at an access point a request message sent from a mobile device; and
in response to receiving the request message, transmitting, from the access point to the mobile device, a reply message including data representative of a transmitted signal power level at the access point of the reply message;
wherein the reply message including the data representative of the transmitted signal power level at the access point is configured to enable determination of a received signal power level at the mobile device of the reply message, a round trip time derived from measured timing signals corresponding to a first time instance when the request message was transmitted from the mobile device and a second time instance when the reply message including the data representative of the transmitted signal power level at the access point was received at the mobile device, and a path loss associated with the reply message or a distance between the mobile device and the access point or combination thereof, the path loss or the distance or the combination thereof computed based on the received signal power determined from the reply message and the data representative of the access point transmitted signal power level included in the reply message.

29. The method of claim 28, wherein the reply message is further configured to enable determination of the transmitted signal power level of the reply message at the access point.

30. The method of claim 28, wherein the reply message is further configured to enable, using the determined received signal power level of the reply message, determination of a received signal strength indication (RSSI).

31. The method of claim 28, wherein transmitting the reply message comprises:
transmitting the reply message from the access point with a highest signal power level permissible for the access point.

32. The method of claim 28, wherein receiving the request message comprises:
receiving by the access point a positioning packet to facilitate determination of a geographical position of the mobile device.

33. The method of claim 28, wherein transmitting the reply message comprises:
transmitting an acknowledgement message from the access point in response to receiving the request message, wherein at least one of the received signal power level and the round trip time are determined from the acknowledgement message; and
transmitting a measurement reply message by the access point, the measurement reply message including the data representative of the transmitted signal power level at the access point of the measurement reply message.

34. The method of claim 28, wherein the reply message includes a packet formatted based on a TPC Report Element message of an 802.11k protocol.

35. The method of claim 28, wherein the reply message includes one or more of: a packet formatted based on CISCO COMPATIBLE EXTENSIONS™ (CCX™) messages protocol, and a packet formatted based on QUIPS™ messages.

36. A wireless communication apparatus comprising:
a transceiver to transmit and receive communication messages; and
a processor-based device configured to cause operations comprising:
receiving at the wireless communication apparatus a request message sent from a mobile device, and
in response to receiving the request message, transmitting, from the wireless communication apparatus to the mobile device, a reply message including data representative of a transmitted signal power level at the wireless communication apparatus of the reply message,
wherein the reply message including the data representative of the transmitted signal power level at the wireless communication apparatus is configured to enable determination of a received signal power level at the mobile device of the reply message, a round trip time derived from measured timing signals corresponding to a first time instance when the request message was transmitted from the mobile device and a second time instance when the reply message including the data representative of the transmitted signal power level at the access point was received at the mobile device, and a path loss associated with the reply message or a distance between the mobile device and the wireless communication apparatus or combination thereof, the path loss or the distance or the combination thereof computed based on the received signal power determined from the reply message and the data representative of the wireless communication apparatus transmitted signal power level included in the reply message.

37. The wireless communication apparatus of claim 36, wherein the reply message is further configured to enable, using the determined received signal power level of the reply message, determination of a received signal strength indication (RSSI).

38. The wireless communication apparatus of claim 36, wherein the processor-based device configured to cause the operations of transmitting the reply message is configured to cause the operations of:

transmitting the reply message from the wireless communication apparatus with a highest signal power level permissible for the wireless communication apparatus.

39. The wireless communication apparatus of claim 36, wherein the processor-based device configured to cause the operations of receiving the request message is configured to cause the operations of:
receiving by the wireless communication apparatus a positioning packet to facilitate determination of a geographical position of the mobile device.

40. The wireless communication apparatus of claim 36, wherein the processor-based device configured to cause the operations of transmitting the reply message is configured to cause the operations of:
transmitting an acknowledgement message from the wireless communication apparatus in response to receiving the request message, wherein at least one of the received signal power level and the round trip time are determined from the acknowledgement message; and
transmitting a measurement reply message by the wireless communication apparatus, the measurement reply message including the data representative of the transmitted signal power level at the wireless communication apparatus of the measurement reply message.

41. The wireless communication apparatus of claim 36, wherein the reply message includes a packet formatted based on a TPC Report Element message of an 802.11k protocol.

42. A wireless communication apparatus, comprising:
means for receiving at the wireless communication apparatus a request message sent from a mobile device, and
means for transmitting from the wireless communication apparatus to the mobile device, in response to receiving the request message, a reply message including data representative of a transmitted signal power level at the wireless communication apparatus of the reply message,
wherein the reply message including the data representative of the transmitted signal power level at the wireless communication apparatus is configured to enable determination of a received signal power level at the mobile device of the reply message, a round trip time derived from measured timing signals corresponding to a first time instance when the request message was transmitted from the mobile device and a second time instance when the reply message including the data representative of the transmitted signal power level at the access point was received at the mobile device, and a path loss associated with the reply message or a distance between the mobile device and the wireless communication apparatus or combination thereof, the path loss or the distance or the combination thereof computed based on the received signal power determined from the reply message and the data representative of the wireless communication apparatus transmitted signal power level included in the reply message.

43. The wireless communication apparatus of claim 42, wherein the reply message is further configured to enable, using the determined received signal power level of the reply message, determination of a received signal strength indication (RSSI).

44. The wireless communication apparatus of claim 42, wherein the means for transmitting the reply message comprise:
means for transmitting the reply message from the wireless communication apparatus with a highest signal power level permissible for the wireless communication apparatus.

45. The wireless communication apparatus of claim 42, wherein the means for receiving the request message comprise:
means for receiving by the wireless communication apparatus a positioning packet to facilitate determination of a geographical position of the mobile device.

46. The wireless communication apparatus of claim 42, wherein the means for transmitting the reply message comprise:
means for transmitting an acknowledgement message from the wireless communication apparatus in response to receiving the request message, wherein at least one of the received signal power level and the round trip time are determined from the acknowledgement message; and
means for transmitting a measurement reply message by the wireless communication apparatus, the measurement reply message including the data representative of the transmitted signal power level at the wireless communication apparatus of the measurement reply message.

47. The wireless communication apparatus of claim 42, wherein the reply message includes a packet formatted based on a TPC Report Element message of an 802.11k protocol.

48. A non-transitory computer readable media programmed with a set of instructions executable on a processor that, when executed, cause operations for communicating network information comprising:
receiving at an access point a request message sent from a mobile device; and
in response to receiving the request message, transmitting, from the access point to the mobile device, a reply message including data representative of a transmitted signal power level at the access point of the reply message;
wherein the reply message including the data representative of the transmitted signal power level at the access point is configured to enable determination of a received signal power level at the mobile device of the reply message, a round trip time derived from measured timing signals corresponding to a first time instance when the request message was transmitted from the mobile device and a second time instance when the reply message including the data representative of the transmitted signal power level at the access point was received at the mobile device, and a path loss associated with the reply message or a distance between the mobile device and the access point or combination thereof, the path loss or the distance or the combination thereof computed based on the received signal power determined from the reply message and the data representative of the access point transmitted signal power level included in the reply message.

49. The computer readable media of claim 48, wherein the reply message is further configured to enable, using the determined received signal power level of the reply message, determination of a received signal strength indication (RSSI).

50. The computer readable media of claim 48, wherein the instructions to cause the operations of transmitting the reply message comprise instructions to cause the operations of:
transmitting the reply message from the access point with a highest signal power level permissible for the access point.

51. The computer readable media of claim 48, wherein the instructions to cause the operations of receiving the request message comprise instructions to cause the operations of:

receiving by the access point a positioning packet to facilitate determination of a geographical position of the mobile device.

52. The computer readable media of claim 48, wherein the instructions to cause the operations of transmitting the reply message comprise instructions to cause the operations of:
transmitting an acknowledgement message from the access point in response to receiving the request message, wherein at least one of the received signal power level and the round trip time are determined from the acknowledgement message; and
transmitting a measurement reply message by the access point, the measurement reply message including the data representative of the transmitted signal power level at the access point of the measurement reply message.

53. The computer readable media of claim 48, wherein the reply message includes a packet formatted based on a TPC Report Element message of an 802.11k protocol.

54. The method of claim 1, wherein receiving the reply message transmitted from the access point in response to receiving the request message comprises:
receiving the reply message transmitted from the access point in response to receiving the request message such that a single communication exchange between the mobile device and the access point provides the signal power level, the round trip time, and the data representative of the transmitted signal power level at the access point.

55. The method of claim 1, wherein determining, based, at least in part, on the received reply message the at least one of the path loss associated with the reply message and the distance between the mobile device and the access point comprises:
determining the at least one of the path loss associated with the reply message and the distance between the mobile device and the access point according to a relationship:

$$\mu_{RSSI} = AP_{TxPower} - (\alpha + 10 \times \beta \times \log_{10}(\text{distance}))$$

where $\mu_{RSSI}$ is a computed RSSI parameter, $AP_{TxPower}$ is the transmitted signal power level at the access point, distance is the distance of the mobile device to the access point, and $\alpha$ and $\beta$ are experimentally determined parameters.

* * * * *